United States Patent
Nagase

(10) Patent No.: US 8,803,483 B2
(45) Date of Patent: Aug. 12, 2014

(54) SECONDARY BATTERY PACK POWER SUPPLY SYSTEM

(75) Inventor: Kazuhisa Nagase, Sagamihara (JP)

(73) Assignee: NEC Energy Devices, Ltd., Kanagawa (JP)

( * ) Notice: Subject to any disclaimer, the term of this patent is extended or adjusted under 35 U.S.C. 154(b) by 312 days.

(21) Appl. No.: 13/318,641

(22) PCT Filed: Sep. 16, 2009

(86) PCT No.: PCT/JP2009/004625
§ 371 (c)(1),
(2), (4) Date: Nov. 3, 2011

(87) PCT Pub. No.: WO2011/033558
PCT Pub. Date: Mar. 24, 2011

(65) Prior Publication Data
US 2012/0056597 A1    Mar. 8, 2012

(51) Int. Cl.
*H02J 7/00*    (2006.01)

(52) U.S. Cl.
USPC ............................. 320/135; 320/112; 320/114

(58) Field of Classification Search
USPC .......................................................... 320/135
See application file for complete search history.

(56) References Cited

U.S. PATENT DOCUMENTS

| 5,563,493 | A | * | 10/1996 | Matsuda et al. | 320/124 |
| 2007/0090793 | A1 | | 4/2007 | Eguchi et al. | |
| 2009/0085516 | A1 | * | 4/2009 | Emori et al. | 320/118 |

FOREIGN PATENT DOCUMENTS

| JP | 2000-116014 A | 4/2000 |
| JP | 2001-057247 A | 2/2001 |
| JP | 2001-086662 A | 3/2001 |
| JP | 2004-229391 A | 8/2004 |
| JP | 2005-323483 A | 11/2005 |
| JP | 2008-182810 A | 8/2008 |
| JP | 2009-513095 A | 3/2009 |
| JP | 2009-240103 A | 10/2009 |
| TW | 512571 B | 12/2002 |
| TW | 200937800 A | 9/2009 |

OTHER PUBLICATIONS

Office Action dated Sep. 5, 2012, issued by the Japanese Patent Office in counterpart Japanese Application No. 2008-085134.
Office Action dated Aug. 14, 2012, issued by the Taiwanese Patent Office in counterpart Taiwanese Application No. 098132438.
Office Action dated Oct. 18, 2013, issued by the State Intellectual Property Office of the People's Republic of China in counterpart Chinese Application No. 200980161465.2.
Search Report dated Nov. 27, 2013, issued by the European Patent Office in counterpart European Application No. 09849418.0.
Office Action dated Apr. 14, 2014 from the State Intellectual Property Office, P.R. China in counterpart application No. 200980161465.2.

* cited by examiner

*Primary Examiner* — Arun Williams
(74) *Attorney, Agent, or Firm* — Sughrue Mion, PLLC

(57) ABSTRACT

To provide a secondary battery pack system that controls battery packs which are connected in parallel without requiring a complex system configuration, a secondary battery pack system of the present invention that supplies power to an electronic device includes a plurality of battery packs each having a controller, a main body side connection circuit which is provided on the electronic device side so as to be connected to the plurality of battery packs, and a main body side discharge control signal line which is provided in the main body side connection circuit. The main body side discharge control signal line and controllers of the plurality of battery packs are connected to each other.

4 Claims, 4 Drawing Sheets

(A)

State where no battery pack discharges its energy (B)

State where one battery pack discharges its energy (C)

State where two battery packs discharge their energy

SECONDARY BATTERY PACK POWER SUPPLY SYSTEM

CROSS REFERENCE TO RELATED APPLICATION

This application is a National Stage of International Application No. PCT/JP2009/004625 filed Sep. 16, 2009, the contents of all of which are incorporated herein by reference in their entirety.

TECHNICAL FIELD

The present invention relates to a secondary battery pack system for supplying power to an electronic device, etc., and, more particularly, to a secondary battery pack system in which a plurality of battery packs can be connected in parallel.

BACKGROUND ART

A conventional system capable of using secondary battery packs connected in parallel has a configuration in which a diode is used for each battery pack to prevent backflow of electricity for parallel connection or a control signal is issued from a system main body so as to cause each battery pack to discharge its energy.

For example, PTL 1 (JP-A-2004-229391) discloses a battery pack having first and second battery blocks each in which a plurality of secondary batteries are connected in series and in parallel, one battery terminal to which one terminals of the first and second battery blocks are connected respectively via first and second switch means, the other battery terminal to which the other terminals of the first and second battery blocks are connected, a switch means for switching the first and second switch means when charging or discharging is carried out, a capacity detection means for detecting the capacity of each of the batteries in the first and second battery blocks, and a switch control means for controlling the switch means depending on the detected battery capacity, and when the first and second switch means are switched, after elapse of a predetermined time when one of the first and second switch means is turned OFF, the other switch means is turned ON.
[PTL 1] JP-A-2004-229391

DISCLOSURE OF THE INVENTION

Problems to be Solved by the Invention

In the conventional system in which battery packs are connected in parallel and a diode is used for each battery pack to prevent backflow of electricity, power of a battery pack having a higher voltage is first consumed and, finally, all the battery packs connected in parallel are simultaneously over discharged. Then, the battery packs are removed from the system one by one for charging. In this procedure, the time at which charging is to be done is hard to make out.

Further, in the configuration in which a control signal issued from the system main body is used to control the parallel-connected battery packs, in order to manage the residual capacity of each battery pack, it is necessary to measure the voltage, current, and temperature of each battery pack, to transmit thus obtained measurement information to the system main body, and to determine a battery pack that discharges its energy based on the measurement information. That is, devices or sensors for the above measurements and connector or IC chips for communication, etc., need to be provided, complicating the system configuration, which may result in an increase in cost.

Means for Solving the Problems

To solve the above problems, the invention according to an exemplary embodiment is a secondary battery pack system for supplying power to an electronic device, including: a plurality of battery packs each having a controller; a main body side connection circuit which is provided on the electronic device side so as to be connected to the plurality of battery packs; and a main body side discharge control signal line which is provided in the main body side connection circuit. The main body side discharge control signal line and controllers of the plurality of battery packs are connected to each other.

The aforementioned exemplary embodiment is further characterized in that when the battery pack is attached to the electronic device, a discharge control signal line of the controller is connected to the main body side discharge control signal line.

The aforementioned exemplary embodiment is further characterized in that a battery connection signal for recognizing a connection of the battery pack is input to the controller.

The aforementioned exemplary embodiment is further characterized in that a discharge control signal input from the main body side discharge control signal line is pulled up by a pull-up resistor and is distributed into two lines, and one of the distributed signals is input to the controller via a resistor and the other is directly input to the controller.

The aforementioned exemplary embodiment is further characterized in that in the main body side connection circuit, the discharge control signal of the battery pack is connected to the main body side discharge control signal line, which is then pulled up by a resistor, and in the main body side connection circuit, the battery connection signal is connected to a GND terminal.

The aforementioned exemplary embodiment is further characterized in that when the battery pack is connected to the main body side connection circuit and the level of the battery connection signal is changed, establishment of a connection between the battery pack and main body side connection circuit is recognized, and the voltage of the discharge control signal is read by the controller in the battery pack so as to determine whether discharging is permitted or not.

Advantages of the Invention

According to the secondary battery pack system of the embodiment of the present invention, it is possible to control the battery packs which are connected in parallel without necessity of measuring the voltage, current, and temperature of each battery pack, transmitting thus obtained measurement information to the system main body, and determining a battery pack that discharges its energy based on the measurement information. This eliminates the need to provide devices or sensors for the above measurements and connector or IC chips for communication, etc., to simplify the system configuration, leading to a reduction in cost.

BEST MODE FOR CARRYING OUT THE INVENTION

Figure 1:
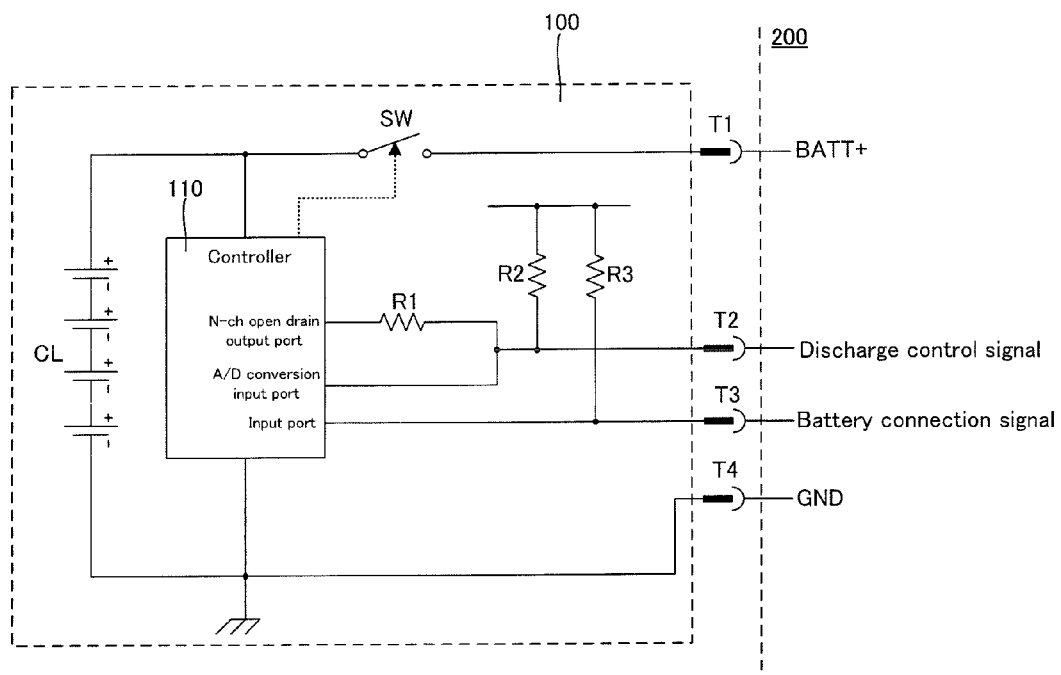
FIG. 1 is a view schematically illustrating a circuit configuration of one battery pack constituting a secondary battery pack system according to an embodiment of the present invention.

An embodiment of the present invention will be described below with reference to the accompanying drawings. FIG. 1 is a view schematically illustrating a circuit configuration of one battery pack constituting a secondary battery pack system according to the embodiment of the present invention.

In FIG. 1, reference numeral 100 denotes a battery pack, 110 denotes a controller, CL denotes secondary battery cells, SW denotes a discharge switch, R1, R2, and R3 each denote a resistor, T1, T2, T3, and T4 each denote a connection terminal, and 200 denotes an electronic device.

In this configuration, power charged in the secondary battery cells CL of the battery pack 100 is supplied to the electronic device 200 via the discharge switch SW that is tuned ON/OFF by the control of the controller 110. Particularly, the present embodiment targets a secondary battery pack system in which a plurality of the battery packs 100 are connected in parallel.

The controller 110 constituted using a microcomputer or the like has an N-ch open drain output port, an A/D conversion input port, and an input port. Based on inputs via these ports, the controller 110 turns ON/OFF the discharge switch SW to thereby control power supply to the electronic device 200.

The N-ch open drain output port of the controller 110 outputs a signal representing the discharge (switch) state of the battery pack.

The A/D conversion input port of the controller 110 periodically fetches a signal representing the discharge (switch) state of the battery pack.

The input port of the controller 110 confirms the connection state between the battery pack and a system main body and, in the case where the connection between the battery pack and system main body is not established, turns OFF the discharge switch, and extends the signal fetching period of the A/D conversion input port or stops the operation of the controller. The above function of the input port is useful for reducing power consumed inside the battery pack.

The battery pack 100 is provided with four connection terminals T1 to T4. The battery pack 100 is connected to the electronic device 200 via the connection terminals T1 to T4.

The connection terminal T1 is a terminal (BATT+) for power supply, connection terminal T2 is a terminal for discharge control signal, connection terminals T3 is a terminal for battery connection signal, and connection terminal T4 is a ground terminal (GND).

A discharge control signal input via the connection terminal T2 is pulled up by the resistor R2 in the battery pack 100 and is distributed into two lines for input to the controller 110. One of the distributed signals is connected to the N-ch open drain output port via the resistor R1 and the other is directly connected to the AD conversion port.

The discharge control signal of the battery pack 100 that is discharging its energy makes the N-ch open drain output port into a low state to thereby notify other battery packs of information indicating that discharging is being performed.

The battery connection signal is pulled up by the resistor R3 in the battery pack 100 and is connected to the input port of the controller 110.

Figure 2:
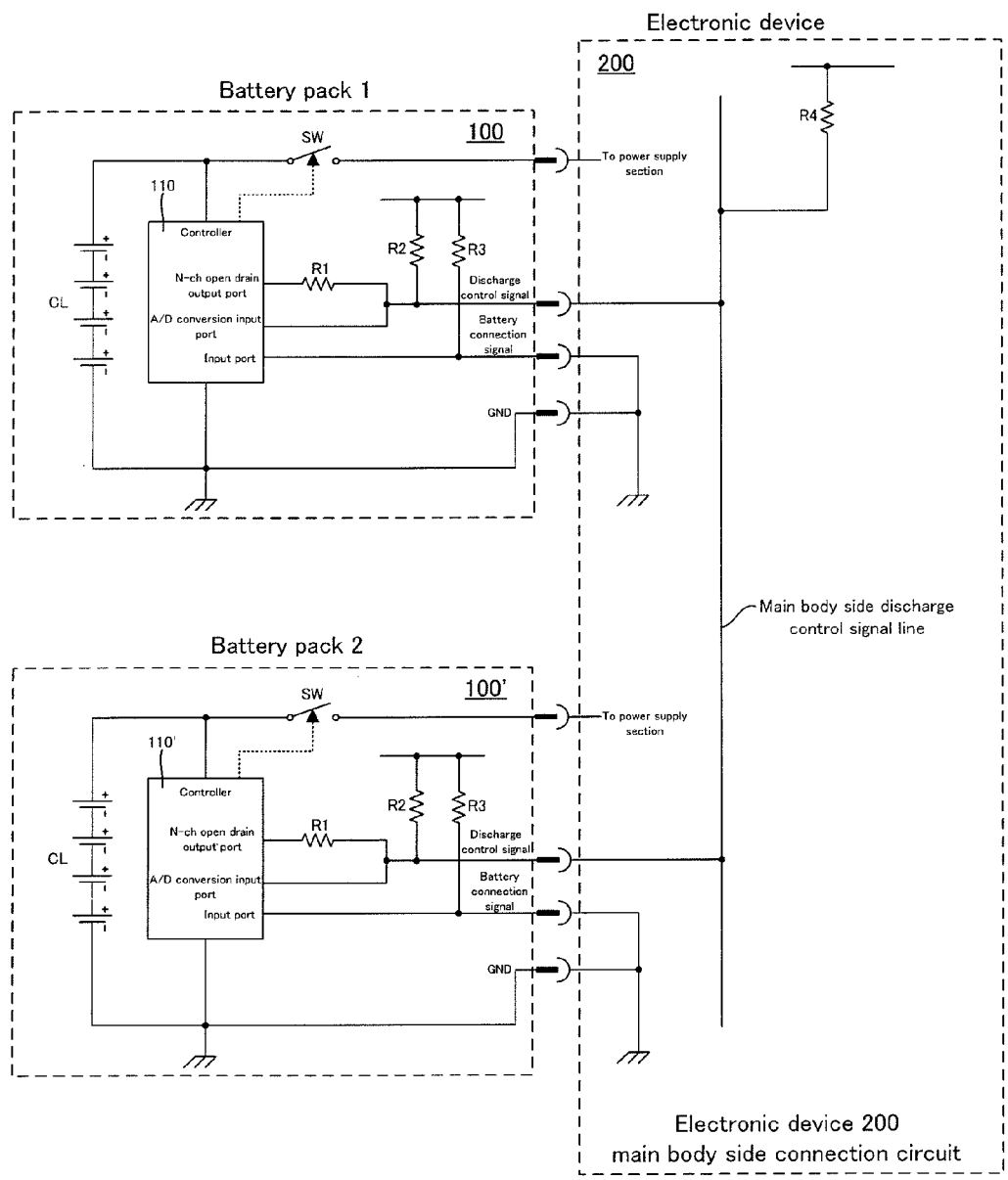
FIG. 2 is a view schematically illustrating a circuit configuration of a secondary battery pack system according to the embodiment of the present invention.

Next, a secondary battery pack system in which two battery packs 100 each having the above configuration are connected in parallel will be described. FIG. 2 is a view schematically illustrating a circuit configuration of a secondary battery pack system according to the embodiment of the present invention. FIG. 2 illustrates a secondary battery pack system including two battery packs which are connected in parallel. In FIG. 2, reference numeral 100 denotes a battery pack 1, and 100' denotes a battery pack 2 for the sake of simplification. The battery packs 1 and 2 each have the same configuration as the battery pack illustrated in FIG. 1.

The discharge control signals from the battery packs 1 and 2 are connected to a main body side discharge control signal line of a main body side connection circuit of the electronic device 200 and are pulled up by a resistor R4.

When the battery pack is connected to the main body side connection circuit of the electronic device 200, the terminal T3 for battery connection signal is connected to GND as illustrated. Further, when the battery pack is connected to the main body side connection circuit, the battery connection signal to be input to the input port is changed from Hi-level to Low level, whereby the controller can recognize that a connection between the battery pack and main body have been established.

Next, the discharge control signal line of the secondary battery pack system of FIG. 2 will be described. FIGS. 3(A) to 3(C) are views each obtained by extracting only the discharge control signal line of the secondary battery pack system according to the embodiment of the present invention.

Figure 3:
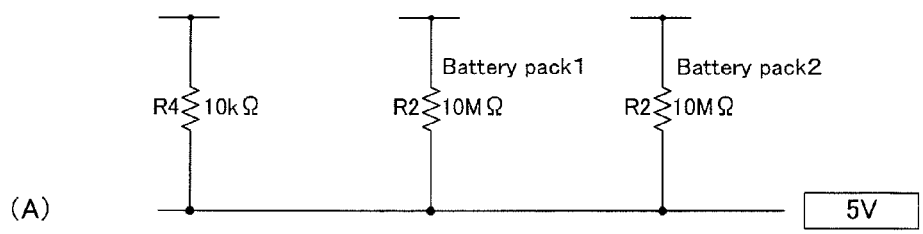
FIGS. 3(A) to 3(C) are views each obtained by extracting only a discharge control signal line of the secondary battery pack system according to the embodiment of the present invention.
Figure 3:
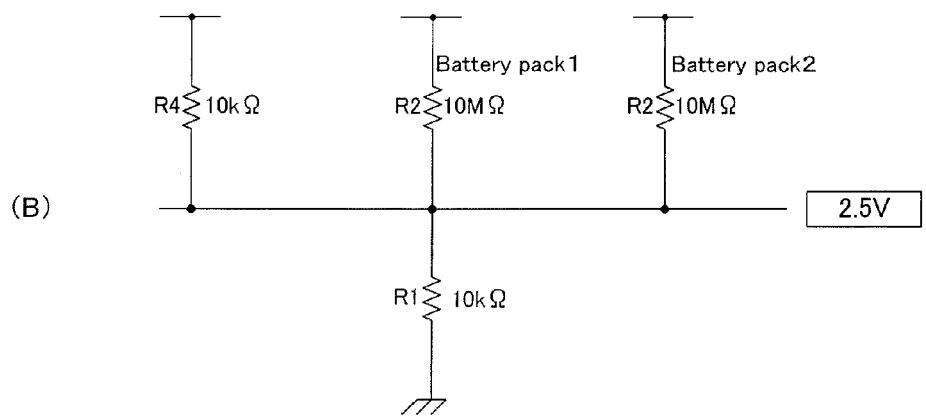
Figure 3:
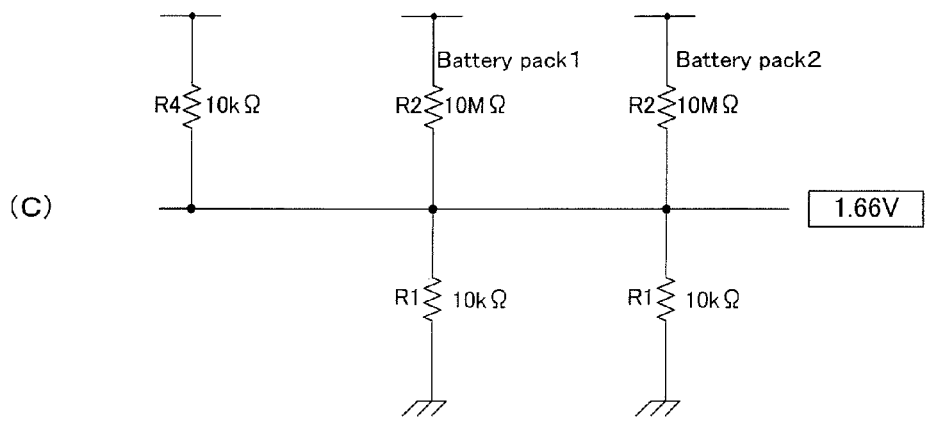

In FIG. 3, for more concrete description, the resistance value of each resistor connected to the discharge control signal line is set as follows: R1=10 KΩ, R2=10 MΩ, and R4=10 KΩ.

FIG. 3(A) illustrates a state where no battery pack discharges its energy, FIG. 3(B) illustrates a state where one battery pack discharges its energy, and FIG. 3(C) illustrates a state where two battery packs discharge their energy.

In the case of FIG. 3(A) representing a state where no battery pack discharges its energy, the terminal of the N-ch open drain output port is opened, so that the voltage pulled up to 5 V can be directly seen, and thus the voltage of the discharge control signal line is 5V.

In the case of FIG. 3(B) representing a state where one battery pack discharges its energy, the terminal of the N-ch open drain output port assumes a LOW level, that is, the terminal of the N-ch open drain output port is connected to GND. The sum of values of the pull-up resistors is 9.98 kΩ, and the value of the pull-down resistor is 10 kΩ, so that the voltage of the discharge control signal line is about 2.5 V.

In the case of FIG. 3(C) representing a state where two battery packs discharge their energy, the pull-down resistors of 10 kΩ are arranged in two-parallel configuration, resulting in 5 kΩ. The sum of values of the pull-up resistors is 9.98 kΩ, so that the voltage of the discharge control signal line is about 1.66 V.

As described above, according to the configuration of the present invention, when the number of battery packs that discharge their energy is increased, the voltage of the discharge control signal line is decreased, making it easy to grasp whether one or more battery packs discharge their energy or individual battery pack discharges its energy without requiring a complicated system.

Figure 4:
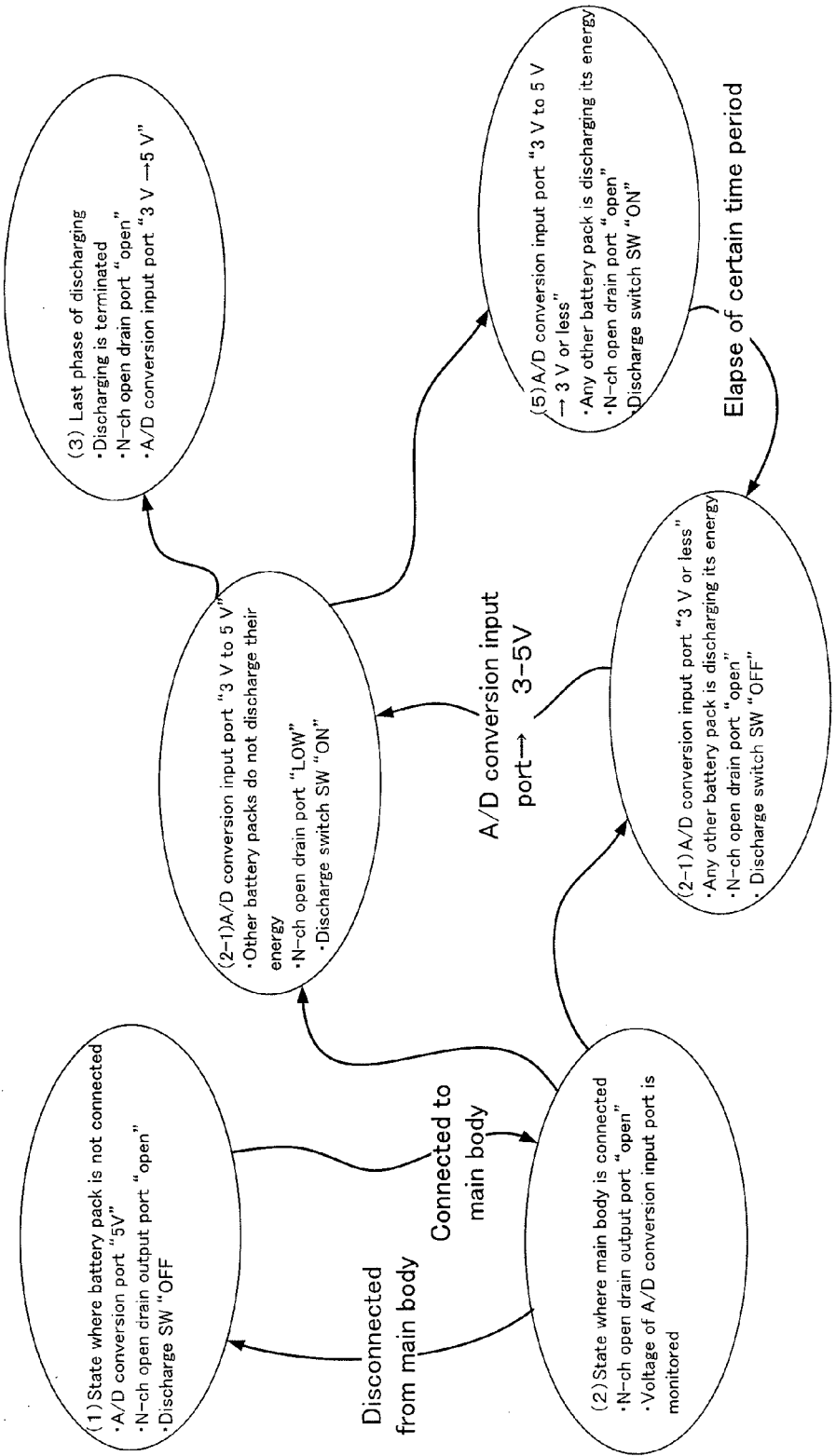
FIG. 4 is a state transition view of the secondary battery pack system according to the embodiment of the present invention.

Hereinafter, the basic operation of the controller 110 of the secondary battery pack system according to the embodiment of the present invention will be described. FIG. 4 is a state transition view of the secondary battery pack system according to the embodiment of the present invention.
(1) State where Battery Pack is not Connected
Battery connection signal: Hi-level
Discharge control signal: N-ch open drain output port "open"
Discharge control signal: A/D conversion input port "5V"

Since the battery connection signal assumes a Hi-level, it is determined that the battery pack is in a non-connection state. The discharge switch SW is turned OFF in consideration of possibility of external short circuit of the battery pack.
(2) State where Battery Pack is Connected to Main Body Side Connection Circuit
Battery connection signal: Low level
Discharge control signal: N-ch open drain output port "open"
Discharge control signal: A/D conversion input port "3 V to 5V"
→Other battery packs do not discharge their energy→Discharge control signal: N-ch open drain output port "LOW"→Discharge switch SW "ON"
Discharge control signal: A/D conversion input port "3 V or less"
→Any other battery pack is discharging its energy→Discharge control signal: N-ch open drain output port "open"→Discharge switch SW "OFF"
(3) Last Phase of Discharging of Battery Pack
Discharge control signal: N-ch open drain output port "Low"→"open"
Discharge control signal: A/D conversion input port "changing from 3 V or less to 5V"
(4) State where Battery Pack Issues Discharge Control Signal while Being Connected to Main Body Side Connection Circuit
In the case where N-ch open drain output port is "open"
Discharge control signal: A/D conversion input port "changing to 3V or more"
→discharge of any other battery pack is ended→discharge switch is turned ON
Discharge control signal: N-ch open drain output port "Low"
Discharge control signal: A/D conversion input port "3 V or less"
→Any other battery pack is discharging its energy→Discharge control signal: N-ch open drain output port "open"→Discharge switch SW "OFF"
(5) State where Battery Pack is Discharging its Energy
After confirming that any other battery pack is discharging with discharge switch held in ON position for given time, the discharge switch SW is turned OFF.
Discharge control signal: A/D conversion input port "2 V or less"
→Any other battery pack is discharging its energy→Discharge control signal: N-ch open drain output port "open"→Discharge switch SW "ON"

The present invention is designed mainly for a battery pack having a two or more series-connected battery cells (about 8 V). Further, it is possible to use even a battery pack having one series-connected battery cell by changing the detection range of the A/D conversion input port.

As described above, the battery pack constituting the secondary battery pack system according to the embodiment of the present invention has the discharge control signal and battery connection signal. A control is made based on the state of these signals so as not to allow a control-target battery pack to perform discharging when any other battery pack than the control-target battery pack is discharging its energy. As a result, the battery packs discharge their energy in a one-by-one manner. Then, at the last phase of discharging, the discharge control signal is change from "Low" to "open" to allow the next battery pack to start discharging its energy so as to continue power supply. Thus, it is possible to remove only the fully discharged battery pack for charging.

INDUSTRIAL APPLICABILITY

The present invention relates to a secondary battery pack system whose use has recently extended into the field of electrically-powered device or storage. Conventionally, parallel-connected individual battery packs constituting such a secondary battery pack needed to be provided with devices or sensors with which a higher-level controller manages voltage, current, temperature, and the like, causing cost increase. On the other hand, in the secondary battery pack system, a controller is provided for each of a plurality of the battery packs so as to eliminate the above devices or sensors. This contributes to cost reduction and thereby enhance industrial applicability.

EXPLANATION OF REFERENCE SYMBOLS

100: Battery pack
110: Controller
200: Electronic device
CL: Secondary battery cell
SW: Discharge switch
R1, R2, R3: Resistor
T1, T2, T3, T4: Connection terminal

The invention claimed is:

1. A secondary battery pack system for supplying power to an electronic device, comprising:
   a plurality of battery packs each having a controller;
   a main body side connection circuit which is provided on the electronic device side so as to be connected to the plurality of battery packs; and
   a main body side discharge control signal line which is provided in the main body side connection circuit, wherein
   the main body side discharge control signal line and controllers of the plurality of battery packs are connected to each other in parallel,
   a battery connection signal for recognizing a connection of the battery pack is input to the controller, and
   a discharge control signal input from the main body side discharge control signal line is pulled up by a pull-up resistor and is distributed into two lines, and one of the distributed signals is input to the controller via a resistor and the other is directly input to the controller.

2. The secondary battery pack system according to claim 1, wherein,
   in the main body side connection circuit, the discharge control signal of the battery pack is connected to the main body side discharge control signal line, which is then pulled up by a resistor, and
   in the main body side connection circuit, the battery connection signal is connected to a GND terminal.

3. The secondary battery pack system according to claim 2, wherein,
   when the battery pack is connected to the main body side connection circuit and the level of the battery connection signal is changed, establishment of a connection between the battery pack and main body side connection circuit is recognized, and the voltage of the discharge control signal is read by the controller in the battery pack so as to determine whether discharging is permitted or not.

4. A secondary battery pack system for supplying power to an electronic device, comprising:
   a plurality of battery packs each having a controller;
   a main body side connection circuit which is provided on the electronic device side so as to be connected to the plurality of battery packs; and
   a main body side discharge control signal line which is provided in the main body side connection circuit, wherein
   the main body side discharge control signal line and controllers of the plurality of battery packs are connected to each other in parallel,
   when the battery pack is attached to the electronic device, a discharge control signal line of the controller is connected to the main body side discharge control signal line,
   a battery connection signal for recognizing a connection of the battery pack is input to the controller, and
   a discharge control signal input from the main body side discharge control signal line is pulled up by a pull-up resistor and is distributed into two lines, and one of the distributed signals is input to the controller via a resistor and the other is directly input to the controller.

* * * * *